United States Patent Office 2,980,631
Patented Apr. 18, 1961

2,980,631

REGENERATION OF NOBLE METAL CATALYSTS

Robert G. Craig, Wilmington, Del., and Donald H. Stevenson, Milmont Park, Pa., assignors to Houdry Process Corporation, Wilmington, Del., a corporation of Delaware No Drawing. Filed Dec. 30, 1954, Ser. No. 478,926

2 Claims. (Cl. 252—419)

This invention relates to the regeneration of a platinum-containing catalyst, and particularly to the procedure to be employed in a gasoline reforming process during the period from the deactivation of the catalyst until the catalyst is in condition for reuse as a reforming catalyst employed in a fixed bed of catalyst as distinguished from other procedures using suspended catalyst, gravitating catalyst or fluidized catalyst.

Catalysts consisting predominantly of a microporous refractory, and containing from about 0.05 to 2% platinum are effective in the reforming of naphtha stocks to bring about the formation of aromatic compounds and/or gasoline of higher octane rating. It is possible to operate such a reforming process for a period such as from 1 to 6 months prior to the degeneration of the catalyst to such a low degree of activity as to necessitate regeneration of the catalyst. Thus the use of the platinum on alumina catalyst is generally considered to be non-regenerative, as distinguished from those methods of reforming gasoline in which the regeneration of the catalyst at frequencies such as several times per week or day are necessary.

It has been found heretofore that catalysts comprising platinum on alumina can be restored to have an initial activity substantially equivalent to that of fresh catalyst, by methods such as described in the application of Robert G. Craig and Donald H. Stevenson, Serial No. 257,666, filed November 21, 1951, entitled "Regeneration of Noble Metal Catalysts," now abandoned, and assigned to the same assignee as herein, of which this is a continuation-in-part. Several other methods have been proposed for regenerating platinum on alumina catalysts. Although freshly regenerated platinum catalyst has been quite active, and although it has been possible in some instances to use regenerated catalyst at a high level over an extended operating period, such operating periods have been of significantly shorter duration than those attainable using fresh catalyst. That is, it has been found that previous attempts to revive a platinum type reforming catalyst have resulted in compositions which were less stable than fresh catalyst. Thus, for example, if a catalyst were suitable for six months' operation initially, it might be useful for only about three months after the first regeneration, six weeks after the second regeneration, and only a period of days after subsequent regenerations. Inasmuch as this loss of stability has had a cumulative effect which has increased in a manner similar to a logarithmic function, the reduction of the percentage loss of stability upon regeneration has been a much desired goal. The regeneration of a platinum on alumina catalyst is conducted so infrequently, and the preservation of long term stability is so important, and the regeneration cost is so great that the operation must be contrasted with the regeneration of a clay cracking catalyst. As an example of how relatively expensive regeneration of a platinum reforming catalyst may be, it has been noted that the regeneration cost may be greater than the cost of completely replacing a cheap clay catalyst in a hydrocarbon conversion unit of equivalent capacity.

In some reforming operations over a platinum on alumina catalyst, a small amount of halide compound is employed in the feed and/or catalyst carrier. Ordinarily such reforming catalysts contain from about 0.05 to about 0.7% by weight of halide, the amount being controlled relative to the equilibrium value for the reforming conditions employed. Ordinarily the halide component of the reforming catalyst significantly increases the cracking activity of the catalyst. In order to maintain a proper balance in such a dual function catalyst, and in order to maintain the cracking activity attributable to the halide at the desired level, a small amount (e.g. 0.002 to 0.004% by weight of the feed but not more than about one-hundredth of concentration of the platinum on the catalyst) of halide addition agent is incorporated in the feed.

Inasmuch as platinum has an atomic weight about 5.5 times that of chlorine, the mol percent concentration of the halide in the catalyst has been of the same order of magnitude as the mol percent concentration of platinum. The halide concentration of an effective reforming catalyst has usually been less than the platinum concentration on a weight basis, but greater than the platinum concentration on a mol basis.

Under some coke burning conditions, volatile platinum halide compounds can be formed. Attempts to regenerate catalysts containing such residual halide have sometimes resulted in the formation of volatile platinum compounds, leading to migration, deactivation, or serious losses of platinum. The presence of halide under regeneration conditions tends to catalyze the transition of gamma alumina to alpha alumina thereby adversely affecting the activity of the reforming catalyst. Although the regeneration of any platinum on alumina catalyst is difficult, particularly troublesome problems are encountered in regenerating a catalyst containing both halide and platinum.

In the regeneration of other kinds of coke-contaminated catalysts, the step of burning the coke has been substantially the only step of significance. However, in the development of the present invention, it was established that steps during the shut-down procedure and/or start-up procedure seriously affected the overall efficiency of regeneration, and that a regeneration procedure is desirably considered as comprising procedures for shut-down, coke-burning, and start-up.

Previous methods for regenerating catalysts have generally made use of flue gas (containing large amounts of carbon dioxide) as a diluent for the air employed to burn the coke. In some previous proposals for regenerating platinum on alumina catalysts, the gas mixture employed for bringing about the combustion of the coke deposited on the catalyst has contained significant amounts of carbon dioxide.

In accordance with the present invention, the platinum on alumina catalyst is decoked by the action of a gas containing a predominant amount of inert gas and only a small oxygen concentration (e.g. from about 10 to 20 mm. during most of the combustion, and not more than about 150 mm. in final combustion) and containing not more than 1% by volume of carbon dioxide. It is desirable to recirculate such inert gas, removing carbon dioxide and adding oxygen and/or air during each cycle of the circulation. Thus the exit gas from the coke burning zone can be scrubbed with dilute aqueous alkaline solution to remove a significant portion of the carbon dioxide. The scrubbing of the exit gases so that the inlet gases recirculated to the decoking zone contain only small amounts of acidic gases constitutes an important feature of the invention; however, the highly advantageous results of the present invention are attributable to the combination of interrelated steps in an integrated operation.

In accordance with the present invention, an alumina catalyst containing both halide and platinum is regenerated in such a manner that no significant amount of platinum is volatilized, in such a manner that the halide compounds volatilized during the regeneration are removed from the gas stream prior to recirculation over the catalyst, and in such a manner that the decoked, reduced and activated platinum on alumina catalyst is given a prehaliding treatment in which a decomposable organic halide is mixed with a recirculating stream of hot, high pressure hydrogen at a rate equivalent to a once through partial pressure of hydrogen halide of about 1 mm., and the organic halide addition is continued until the amount of hydrogen halide injected represents about 0.2% by weight of the reforming catalyst.

In accordance with the present invention, a gasoline reforming unit performing poorly because of the coke accumulation on the alumina-halide-platinum catalyst is restored to good performance characteristics by a method which includes the following steps:

(a) The flow of the naphtha charge stock (containing, e.g. 0.002% propylene chloride) to the reforming zone is decreased and then discontinued;

(b) A gas consisting predominantly of hydrogen, such as is recycled during reforming operations, continues to circulate through the isolated system comprising the catalyst chambers and pumps at a pressure and rate equivalent to that of reforming operation as the unit is allowed to cool by conduction and radiation from the operating temperature of about 975° F. to a moderate temperature within the range from 475° F. to about 700° F.;

(c) After the temperature of the unit has been reduced to the moderate temperature (475–700° F.), the gas pressure in the system is allowed to diminish (e.g. by withdrawing hydrogen into a storage tank or fuel line) until hydrogen is circulating at atmospheric pressure;

(d) The system is subjected to vacuum to reduce the pressure to approximately 76 mm. Hg absolute pressure (approximately 0.1 atmosphere) thereby removing most of the hydrogen;

(e) An inert gas substantially free from oxygen, sulfur dioxide and carbon dioxide, and consisting predominantly of nitrogen, is introduced into the system which can then be evacuated to about 0.1 atmosphere and refilled with inert gas one or more times if desired. The dilution with inert gas effects flushing and thorough removal of the hydrogen rich gas.

(f) The pressure of the system is increased to approximately 5 atmospheres by the addition of sufficient inert gas.

(g) The inert gas is circulated through the system including the several catalyst chambers in series and heated if necessary until the catalyst is at a temperature appropriate for the combustion of coke, that is between 475° and 850° F.

(h) In the circulating system of predominantly inert gas air is introduced at a point in advance of the catalyst chambers and an approximately corresponding amount of gas is withdrawn at a point beyond the catalyst chambers (maintaining substantially constant pressure) in such a manner that at the entry of the first of series of catalyst chambers the oxygen concentration provides a partial pressure within the range from about 10 to about 20 mm. The absolute pressure of the oxygen, as distinguished from the relative concentration of the oxygen in the mixture, temperature, space rate, weight ratios, and/or the flow rate of the mixture through the apparatus, provides the most convenient criterion for controlling the combustion of the coke on the platinum-alumina catalyst in order to achieve the most rapid combustion attainable without adversely affecting the activity of the catalyst. The temperatures of various portions of the catalyst are not uniform but vary within the range from about 400 to about 850° F., preferably below 750° F., partly because the inlet gas temperature is controlled and because the oxygen partial pressure of said inlet gas is controlled within the 10–20 mm. limits. The peak temperature within the catalyst chambers is initially near the entry to the first chamber, the oxygen being predominantly consumed by the combustion in this zone. The position of the peak temperature zone gradually advances until it reaches the exit of the last catalyst chamber.

(i) The mixture of gases resulting from the combustion of the coke with the oxygen-containing gas stream is subjected to a cooling and scrubbing operation in order to remove a significant portion of the acidic vapors from the recirculated gases. Scrubbing the recirculated gases with an alkaline liquid such as an aqueous solution containing about 10% sodium hydroxide can effect the removal of a large portion of the sulfur dioxide, hydrogen chloride, aluminum fluoride, carbon dioxide, acid gases, and related materials from the gases to be recirculated to the catalyst chambers. Of particular importance, much of the carbon dioxide should be removed from the reaction products resulting from the combustion of the coke in order to achieve the advantageous results of the present invention. Thus, the gas leaving the scrubbing zone contains less than 1% carbon dioxide;

(j) The controlled oxidation of the coke is continued, employing the mixture of air and inert gas free from significant amounts of carbon dioxide, hydrogen chloride, sulfur dioxide, and other acidic gases, whereby most of the coke is burned using an inlet gas having an absolute oxygen pressure within the 10 to 20 mm. range;

(k) After most of the coke is burned by the gas having a 10 to 20 mm. oxygen pressure, and after the zone of peak temperature has advanced to the exit of the last catalyst chamber, the rate of burning the coke diminishes. Thereafter the oxygen introduced is not as completely consumed as before. The temperature of the inlet gas is gradually raised to about 700° F. The control for the introduction of air, instead of being adjusted to maintain 10–20 mm. oxygen pressure in the inlet gas is adjusted to introduce air at increasing rate (measured, for example as s.c.f.m.) finally about equivalent to that prevailing during initial combustion. This permits the oxygen pressure to increase gradually during the final combustion of residual coke. Preferably the peak temperature in the catalyst is below 750° or 850° F. The residual combustion is discontinued after the inlet gas has an oxygen pressure greater than 150 mm., constituting about 3.9% by volume. Although the inlet gas is pre-heated, the easily burned coke is so insignificant by the time the oxygen pressure reaches 150 mm. that there is less than 100° F. and sometimes even less than 50° F. between inlet and exit gas temperatures when the combustion is discontinued.

(l) The system is evacuated to a pressure of approximately 0.1 atmosphere.

(m) The low pressure is maintained during the initial introduction of hydrogen, which reacts with the residual oxygen to form water. This highly exothermic reaction occurs in the platinum catalyst throughout a wide temperature range, and is controlled, not primarily by cooling the catalyst, but by regulating the rate of mixing the reactants. After hydrogen is substituted for the inert gas, additional hydrogen is injected to attain atmospheric pressure. The system is re-evacuated and again filled with hydrogen at atmospheric and then at approximately 600 pounds per square inch (30,400 mm.) pressure. A hydrogen-rich gas comparable to the gas recycled during reforming operations can be employed instead of pure hydrogen. Such a gas may be stored during regeneration, and re-used.

(n) The hydrogen is circulated through the catalyst bed as the temperature in the system is increased to bring the catalyst bed to a temperature of about 825° F., thereby activating the platinum. To the extent that the system containins compounds of metals reducible by hydrogen, such as steel pipes partly rusted during the decoking operation, the hot high pressure hydrogen restores such materials to the metallic state.

(o) After the catalyst has been treated with hydrogen at an elevated temperature for about an hour, the alumina component of the catalyst is conditioned by circulating a mixture of hydrogen and hydrogen chloride, the hydrogen chloride partial pressure being kept below about 2 mm. This constitutes less than about 0.015% hydrogen chloride by volume, but as the temperature and pressure may vary, it is more accurate to express the limitation in terms of absolute pressure at standard conditions. It is very important that the pressure of the hydrogen chloride be kept very low to prevent contamination of the platinum by volatile ferrous chloride and/or the still more volatile ferric chloride. Volatile metal chlorides can form in other parts of the system if the hydrogen chloride partial pressure is excessive. As explained in the application of Heinz Heinemann, Serial No. 416,108, filed March 15, 1954, now Patent No. 2,785,139, and assigned to the same assignee as herein, the relative concentration of hydrogen chloride should not be more than 15% of the equilibrium concentration (at that temperature and pressure) of hydrogen chloride in a hydrogen-hydrogen chloride, ferrous chloride system. Although it is convenient to refer to the presence of hydrogen chloride it is more convenient to employ a heat-decomposable organic halide such as tertiary butyl chloride, propylene chloride, ethylene bromide, butyl fluoride, or the like, as the halide addition agent.

During this treatment with the circulating stream of hydrogen and hydrogen chloride, a portion of the hydrogen chloride is adsorbed by the alumina carrier thereby improving any residual acid function of the dual function catalyst, or imparting such acid function to any halide-free catalyst. Possibly the adsorbed chloride partakes of the nature of aluminum chloride, but its catalytic effect is better understood than its chemical structure. The mixture of hydrogen and hydrogen chloride is circulated for several hours until the amount of decomposable halide injected provides hydrogen halide constituting about 0.2% of the weight of the catalyst. In some cases, this precise and convenient control of the extent of the pre-haliding treatment brings about the adsorption on the catalyst of about 0.1% by weight of hydrogen chloride. Because the circulating gas stream consists predominantly of high pressure hydrogen and only a trace (about 1 mm. on a once-through basis) of hydrogen chloride, the catalyst tends to approach the equilibrium concentration of halide. It is generally economical to discontinue the pre-haliding treatment after two or three hours, and to permit the catalyst to attain its equilibrium halide content during the reforming of gasoline. The pre-haliding treatment is most conveniently regulated to inject hydrogen halide amounting to 0.2% by weight of the catalyst.

(p) Gasoline vapor is introduced into the hydrogen rich stream while continuing the use of halide addition agent. The temperature of the unit is desirably kept at about 825° during the initial treatment with the gasoline, and is then increased to about 925° within about 24 hours. Although the initial reaction of gasoline with a heated platinum on alumina catalyst tends to be highly exothermic, involving considerable hydrocracking, the gasoline can be introduced onto the catalyst pretreated with hydrogen and hydrogen chloride to immediately bring about good reforming of gasoline with its balance of competitive reactions and characterized by the endothermic dehydrogenation reactions. Aromatic hydrocarbons are formed from mixtures of hydrogen and gasoline at reforming conditions. The use of the relatively large amounts of the halide addition agent in the initial gasoline feed is also believed to account in part for the prompt attainment of aromatizing conditions and the substantial avoidance of hydrocracking.

After the naphtha is on stream for a few hours, the propylene chloride concentrations, temperatures and other operating conditions are regulated, not in accordance with a regeneration procedure, but in accordance with normal operation procedures. It is possible to operate the reforming unit at an appropriate octane level for a period of time substantially as long as the previous operating period, and not more than 10% shorter than the previous reforming period, before it is necessary to repeat the catalyst regeneration cycle.

Because the regeneration procedure achieves not merely high initial activity, but also a catalyst stability greater than 90%, the catalyst can be employed time and time again with regeneration at only infrequent intervals, such as every six months.

It has heretofore been known that the octane rating of the reformate was dependent in part upon the severity of reforming conditions. Thus by sacrificing yield and increasing the rate of coke production, it has been theoretically possible to obtain higher octane reformate by employing the platinum alumina catalyst at relatively severe conditions (e.g. initially 930° F. instead of 870° F.). Partly because previous methods of regenerating platinum type reforming catalysts have resulted in greater than 10% decrease in stability of the catalyst, it has not been profitable to operate a reforming unit at the highest attainable octane values. However, the improved regeneration procedure makes it feasible to operate the reforming unit at more severe conditions and with more frequent regeneration of the platinum type reforming catalyst.

The nature of the invention is set forth in the following examples.

Example I

A reforming unit having a rated capacity of about 8,000 barrels per day is operated for a period of about 6 months, during which the temperature of the naphtha feed is gradually raised from about 880° F. to about 970° F. in order to produce gasoline of substantially constant octane (about 83 F-1 clear). During these months of reforming operation, the platinum on alumina catalyst is slowly deactivated. When the catalyst is significantly less effective, as evidenced by the need for an operating temperature of about 975° F., the regeneration procedure is initiated. If operated to produce 92 F-1 clear octane gasoline by using an initial temperature of 930° F., the reforming unit requires a 975° F. operating temperature for maintaining the initial octane level after use for several weeks instead of after several months, and hence more frequent regeneration.

The fires are discontinued in the heaters for the feed and for the interstage heating of the reaction mixture. The injection of propylene dichloride, or other halide addition agent is discontinued. The flow of the naphtha is reduced to approximately half level, and then after about several minutes the flow of naphtha through the catalyst chamber is entirely discontinued. The naphtha is circulated through the feed preparation facilities at approximately half capacity rate in order to have pure dry naphtha available for the startup procedure.

A gas containing predominantly hydrogen is circulated through the catalyst chamber for a period of several hours, during which the temperature of the catalyst chamber falls from about 975° F. to a moderate temperature within the range from about 475 to 700° F., preferably about 500° F. After the catalyst chamber is thus cooled to a moderate temperature, the high pressure recycle gas is withdrawn and discharged into a storage tank, leaving the system at atmospheric pressure. The catalyst chamber and gas recirculation pumps are isolated from the remainder of the reforming unit.

An inert gas generator consisting of a methane burner and a flue gas scrubbing system is operated to produce a sizable volume of inert gas. The gas scrubber includes a contact tower through which about 100 gallons per minute of 10% sodium hydroxide aqueous solution flows countercurrent to the gas stream to be purified. The effluent gas from the alkaline scrubber is preferably but not necessarily subjected to a water washing zone for removing entrained alkaline scrubbing solution, cooling zone and/or drying zone. After it is established that the gas stream leaving the purification system is substantially free from oxygen and carbon dioxide, and is producing an inert gas, the catalyst chamber can again be given attention.

The isolated system comprising the catalyst chamber and recycle gas compressor and associated pipes is evacuated to a pressure of about 76 mm. by a steam-jet vacuum pump, thereby removing substantially all of the hydrogen from the system. The inert gas free from significant amounts of oxygen and/or carbon dioxide is then introduced into the system to bring it to atmospheric pressure. The vacuum purging and refilling with inert gas one or more additional times is desirable but not necessary. The recycle gas compressor is employed to inject additional inert gas to operate the system at the highest pressure obtainable by the recycle gas compressor, such as about 3 or 4 atmospheres. After the system, including the catalyst chamber, caustic scrubbing tower, and recycle compressor is operating at maximum pressure, a pressure release device is adjusted to withdraw any gas in excess of the predetermined pressure.

The feed heaters and interstage heaters are put into operation to heat the inert gas thus recirculated through the system, and to raise the temperature of the catalyst chambers up to about 650° F. Compressed air is injected into the recirculating gas stream at a rate adapted to maintain in the inlet gas flowing to the catalyst chamber an oxygen partial pressure of about 10 to 20 mm. In a reforming unit having a capacity of 8000 b.p.s.d., this requires the addition of approximately 50 cubic feet per minute of air into the inlet gas, and the withdrawal of approximately 50 cubic feet per minute of exit gas from the catalyst chambers through the pressure release device. The fires on the interstage reheaters are discontinued, inasmuch as the regeneration process is exothermic and self-sustaining. Because the caustic scrubber cools the recirculating gas as well as removing the carbon dioxide and other acidic gases, it is sometimes desirable to heat the mixture of air and inert gas fed to the catalyst chamber. In any event, the inlet gas temperature is controlled to maintain the catalyst at coke combustion temperatures (475–850° F.) while the catalyst is subjected to a circulating stream comprising oxygen.

The catalyst chambers are decoked during a period of from about 4 to 24 hours, depending upon the amount of carbon deposited in the catalyst chambers. The temperature in the catalyst chambers remains within the range of from 475 to 850° F., during all of the decoking because the oxygen concentration is kept within the range of from 10 to 20 mm. and partly because the inlet gas temperature is regulated.

The zone of peak temperature in the catalyst chambers gradually advance from the inlet to the outlet. Then the low oxygen concentration supports little combustion, permitting the exit gas temperature to drop. After the temperature of the exit gas falls below about 500° F., the combustion controls are modified to permit an oxygen concentration greater than 20 mm. The addition of air and withdrawal of a corresponding amount of exit gas is continued at a rate (measured in s.c.f.m.) comparable to that employed during the initial combustion, but without the 20 mm. maximum limitation, whereby the oxygen concentration is increased and allowed to accumulate until the oxygen pressure is approximately 150 mm. During this removal of the more difficulty burned carbonaceous deposit, the temperature in the catalyst chambers does not exceed 850° F. The preheaters can be employed to raise the temperature of the gas fed to the first catalyst chamber to about 700° F. in order to assure more complete combustion of the coke. Shortly after or even as soon as a gas stream containing oxygen at 150 mm. pressure and 700° F. can flow through the catalyst chambers without a significant increase in temperature, the catalyst chambers are deemed to be substantially completely decoked. The injection of air is stopped, and the preheater operation is discontinued.

The circulation of the gaseous mixture through the catalyst chambers and through the scrubbing tower is continued until the catalyst chambers have cooled to below 500° F. The recycle gas compressor operation is then discontinued and the system is reduced to atmospheric pressure by discharging the mixture of inert gas and air. The system comprising the catalyst chamber and recycle compressor is isolated from the gas scrubber and from other portions of the reforming apparatus.

The system is evacuated to a pressure of about 76 mm., and hydrogen and/or a hydrogen-rich mixture is introduced into the system. Such a mixture may be formed in and recycled in a reforming operation and may be stored in a suitable tank during the regeneration operation. Inasmuch as the residual oxygen present in the low pressure system can react with the hydrogen in the presence of the platinum catalyst at relatively low temperatures, the hydrogen is introduced into the evacuated system at a sufficiently low rate that the increase in temperature of the catalyst chamber is not significant, and so that the temperature of the catalyst chamber does not exceed about 600° F. It is very important that the platinum catalyst be freed from traces of water, such as the water formed by the combustion of the hydrogen with the residual air. Accordingly, the system is evacuated and refilled with a hydrogen-containing gas one or more additional times. In this manner the isolated system is filled with a hydrogen-rich gas free from oxygen, inert gas, or water.

After the catalyst chamber and compressor are thus filled at atmospheric pressure with hydrogen additional hydrogen is introduced to bring the system to approximately 250 pounds per square inch pressure. A booster compressor may be employed to achieve this higher pressure. The feed heater and interstage heaters are employed to raise the temperature of the circulating high pressure hydrogen stream to 825° F. The hydrogen brings about an activation of the platinum whereby it possesses a higher degree of catalytic activity. It is particularly important that the platinum catalyst be subjected to the elevated temperature, high pressure hydrogen stream for a reasonable period of time, such as 30 minutes, prior to the introduction of the chloride activator. The hydrogen pressure is desirably increased to about 40 atmospheres (600 p.s.i.) before injecting a halide addition agent.

A small amount of propylene dichloride is then injected into the circulating stream to provide a once-through partial pressure of hydrogen chloride of approximately 1 mm. and less than 2 mm. The propylene dichloride decomposes at the elevated temperature to provide hydrogen chloride. It is especially important that the chloride addition be controlled in such a manner as to avoid excessive hydrogen chloride pressure and/or formation of metal chlorides in the pumps or other zones of the reforming system. As explained in said Patent No. 2,785,139 the hydrogen halide concentration should not be more than 15% of its equilibrium concentration in a hydrogen-ferrous chloride system at that temperature and pressure.

A portion of the hydrogen chloride reacts with the alumina to form active acid sites partaking of the nature of aluminum chloride. During a period of 4 or 5 hours propylene chloride is injected at a rate affording a once through hydrogen chloride partial pressure of about 1 mm. By thus injecting about 0.007% by volume of decomposable organic chloride, the alumina catalyst adsorbs preferably approximately 0.1% chloride. Instead of measuring the halide adsorption, it is generally more convenient to measure the amount of hydrogen halide injected into the system, and to discontinue the addition of the decomposable organic halide as soon as an amount of hydrogen halide equal to 0.2 weight percent of the catalyst has been injected into the system. Reforming catalysts contain an equilibrium amount of halide, such as from about 0.05% to about 0.7% chloride, but the halide added by this pretreatment may be more or less than the amount which corresponds to the equilibrium value at initial operating conditions. The equilibrium level should be reached within a few days, but not necessarily a few minutes of naphtha reforming. The decoked catalyst may comprise some halide.

After the halide pre-treatment, the naphtha is introduced, slowly at first, and then at the full rate, and processed for a short period of time at 825° F.

Ordinarily the presence of halide in an alumina catalyst promotes cracking, but according to the present invention, the controlled amount of halide has the surprising effect of inhibiting hydrocracking and preventing the extensive hydrocracking which might otherwise characterize the start-up procedure. Introducing the naphtha at a temperature below reforming temperatures also helps to minimize initial hydrocracking. The temperature profile of the catalyst chamber is conspicuously different because the initial naphtha does not bring about the temperature rise indicative of extensive hydrocracking. The pretreatment with chloride, together with the inclusion of chloride in the initial feed helps to prevent the excessive hydrocracking which ordinarily characterizes the start-up of a platinum type reforming unit.

The temperature of the reforming operation is then gradually raised to about 880° F., whereby the desired octane (about 83 F–1 clear) is achieved in the reformate. The reforming operation is continued for a period of approximately 6 months (more than 25-weeks, and hence not more than 10% less than the 26 week operating period initially) before it is necessary to raise the temperature to 975° F. in order to maintain the desired octane and/or to again regenerate the catalyst. If the reforming unit is operated at a higher octane level, such as 92 the operating period after regeneration is at least 90% of the previous operating period. Thus the regeneration procedure does not adversely affect the stability of the catalyst.

*Example II*

In order to determine the significance of the removal of carbon dioxide from the gas stream recirculated through the coke combustion zone, similar platinum on partially halided alumina reforming catalyst samples were regenerated under conditions generally similar, except as regards the removal of carbon dioxide. The catalysts and regeneration procedures were generally like Example I except on a laboratory scale suitable for determining the effect of the presence or absence of significant amounts of carbon dioxide. The two catalysts were then employed in separate reforming operations. Initially the catalysts were equally effective, the reformate having an F–1 clear octane rating of 91 in each case. After 250 hours use of the regenerated catalysts, the one which had been regenerated in the presence of carbon dioxide formed gasoline having an F–1 clear octane rating of 81, in contrast with an octane rating of 91 for the reformate from a catalyst regenerated using an inert gas free from carbon dioxide. Inasmuch as regeneration conditions do not suggest any known chemical reaction between carbon dioxide and either platinum or alumina, the poor stability of the catalyst regenerated in the presence of carbon dioxide was surprising and unexpected.

In order to explain the unusual phenomena, it has been suggested that some carbon dioxide may react with the carbon, water, and catalyst halide to produce phosgene, and that the phosgene brings about migration, volatilization, or delayed deactivation of the platinum. It has also been suggested that carbon dioxide catalyzes the transition from gamma alumina (desirable as a catalyst carrier) to alpha alumina (unsatisfactory as a carrier for platinum in a reforming catalyst). Although the exact reason has not been determined, it has been established that the catalyst has improved stability when the regeneration is accomplished by feeding an oxygen containing gas substantially free from carbon dioxide to the catalyst chamber. Because carbon dioxide is formed during the coke burning, the effluent from the catalyst chamber might contain as much as 20 mm. pressure of carbon dioxide resulting from the combustion during the passage through the catalyst chamber. The effluent is subjected to a purification procedure characterized primarily by carbon dioxide removal. However, trace amounts of carbon dioxide are necessarily present in the gas fed to the catalyst chamber, and that concentration of carbon dioxide remaining in the gas after the purification treatment (e.g. treatment with 10% sodium hydroxide solution) does not adversely affect the stability of the catalyst. In one test run, the use of a hot water spray chamber did not remove much of the carbon dioxide and did not purify the gas nor permit the preparation of a stable regenerated catalyst. By methods such as those hereindescribed it was established that in the gas fed to the catalyst chamber, the carbon dioxide concentration should be maintained below 1% by volume, and kept below 1 mm. if possible.

Obviously many modifications and variations of the invention as hereinbefore set forth may be made without departing from the spirit and scope thereof, and therefore only such limitations should be imposed as are indicated in the appended claims.

What is claimed is:

1. In a method of regenerating a fixed bed of platinum-on-alumina catalyst particles containing carbonaceous materials deposited during a previous period of reforming gasoline the improvement which consists essentially of: subjecting the catalyst bed to a combustion-supporting gaseous mixture consisting predominantly of nitrogen, containing a restricted amount of oxygen to bring about the combustion of carbonaceous deposits on the catalyst particles, said restricted amount of oxygen providing an absolute pressure within the range from 10 mm. to 20 mm. of mercury, said gaseous mixture being purified to remove acidic gases to reduce the carbon dioxide concentration to less than 1%; withdrawing the effluent from such combustion of the carbonaceous deposits; recirculating at least a portion of such effluent after subjecting such effluent to a step of scrubbing with an aqueous alkaline solution consisting essentially of 10% sodium hydroxide and 90% water to reduce the carbon dioxide content of the gas stream to less than 1%; adding an oxygen-containing gas to the combustion-supporting gaseous mixture to provide a partial pressure of oxygen of from about 10 mm. to about 20 mm. of mercury; thereafter subjecting the catalyst bed to hydrogen at 825° F.; and thereafter subjecting the catalyst bed for about five hours to a gas stream consisting essentially of hydrogen and hydrogen chloride providing an absolute partial pressure of hydrogen chloride of from 0.2 to 2 mm. of mercury.

2. The method of regenerating a fixed bed of platinum-on-alumina catalyst consisting essentially of: circulating a stream of compressed hydrogen through a closed path while cooling the catalyst to a temperature within the range from about 475 to 700° F., said closed path being substantially the same as the gaseous recycle path during the operation of the system for reforming gasoline, said closed path directing the hydrogen stream through a recompression zone and through the catalyst bed; reducing the gas pressure in the catalyst bed to atmospheric and then to about 76 mm. of mercury absolute; flushing with an inert gas to replace hydrogen with inert gas; increasing the pressure of the inert gas to atmospheric and then to about 5 atmospheres; directing the circulating gas stream through a modified closed path comprising a scrubbing zone through which an aqueous alkaline solution consisting essentially of water and 10% sodium hydroxide circulates, thereby removing sulfur dioxide, hydrogen chloride, carbon dioxide and other acidic gases from the circulating gas stream in such a manner that the gas stream leaving the scrubbing zone has a volume concentration of carbon dioxide less than 1%, said modified closed path for the circulating gas stream directing the gas stream through the catalyst bed, through said scrubbing zone, through a pressure relief zone and through an oxygen-concentration regulating zone; withdrawing in said pressure relief zone a portion of the circulating gas stream to maintain continuously a predetermined pressure, introducing air into the circulating gas stream in said oxygen-concentration regulating zone whereby the gas stream entering the catalyst bed has an oxygen partial pressure within the range of from about 10 to about 20 mm. of mercury absolute; controlling the temperature of the gas stream entering the catalyst bed whereby the catalyst bed is maintained at a combustion temperature between 475° F. and 850° F. while burning most of the coke on the catalyst; gradually increasing to more than 100 mm. mercury the absolute pressure of the oxygen in the recirculating gas stream after the combustion of most of the coke; decreasing the pressure of the circulating gas stream to atmospheric; discontinuing the circulation about said modified closed path and circulating the gas stream about a closed path substantially the same as the gaseous recycle path during the reforming of gasoline; decreasing the absolute pressure of the circulating gas stream to about 76 mm. of mercury; flushing the system with hydrogen; increasing the hydrogen pressure from 76 mm. of mercury absolute to atmospheric and then to about 40 atmospheres; circulating compressed hydrogen for about an hour to reactivate the platinum to higher catalytic activity, said hydrogen and catalyst being heated to about 825° F.; thereafter introducing a volatile organic halide decomposing at 825° F. to provide hydrogen halide and serving as a halide addition agent providing hydrogen halide at a partial pressure within the range from 0.2 to 2 mm. of mercury absolute in the circulating mixture of hydrogen and hydrogen halide; and reactivating the acid function of the alumina component of the catalyst by circulating said mixture of hydrogen and hydrogen halide for about five hours.

References Cited in the file of this patent

UNITED STATES PATENTS

| | | |
|---|---|---|
| 2,284,603 | Belchetz et al. | May 26, 1942 |
| 2,396,157 | Claussen | Mar. 5, 1946 |
| 2,641,582 | Haensel | June 9, 1953 |
| 2,642,384 | Cox | June 16, 1953 |
| 2,664,404 | Blatz | Dec. 29, 1953 |
| 2,667,461 | Guyer et al. | Jan. 26, 1954 |
| 2,762,752 | Hemminger | Sept. 11, 1956 |
| 2,785,139 | Heinemann | Mar. 12, 1957 |